No. 629,642. Patented July 25, 1899.
J. WILSON.
FILTER PRESS.
(Application filed Feb. 9, 1899.)
(No Model.) 3 Sheets—Sheet 2.
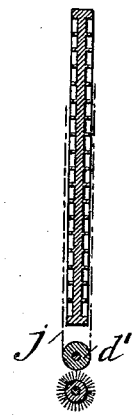
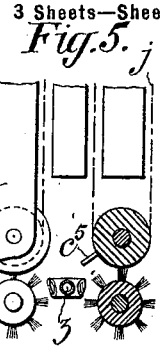
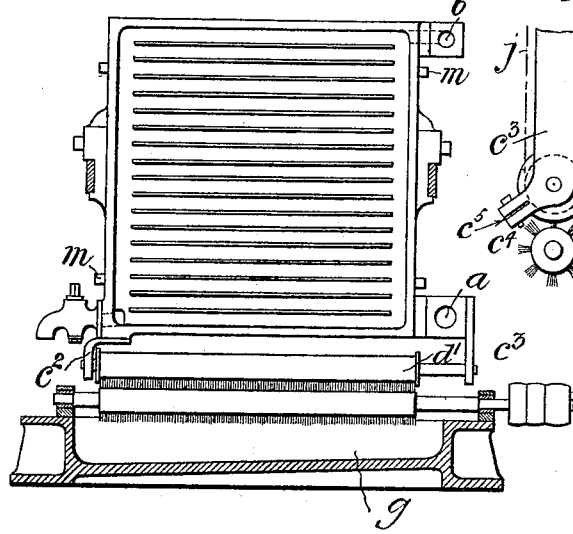
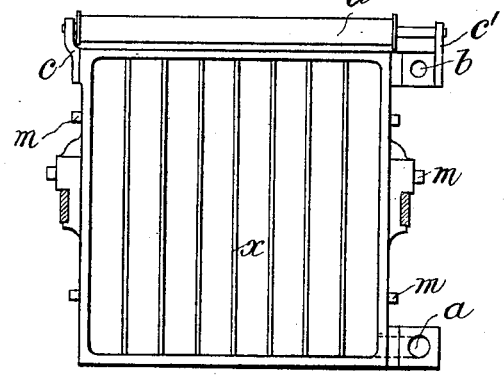
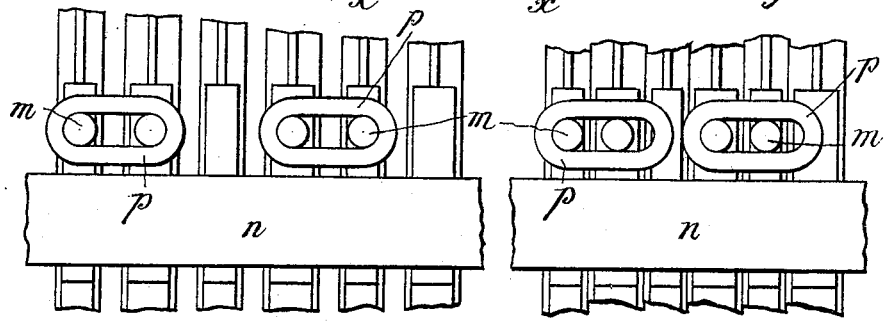
Witnesses:
Clarence A Bateman
Percy C Bowen
Inventor:
John Wilson
by Wilkinson & Fisher,
Attorneys
THE NORRIS PETERS CO., PHOTO-LITHO., WASHINGTON, D. C.

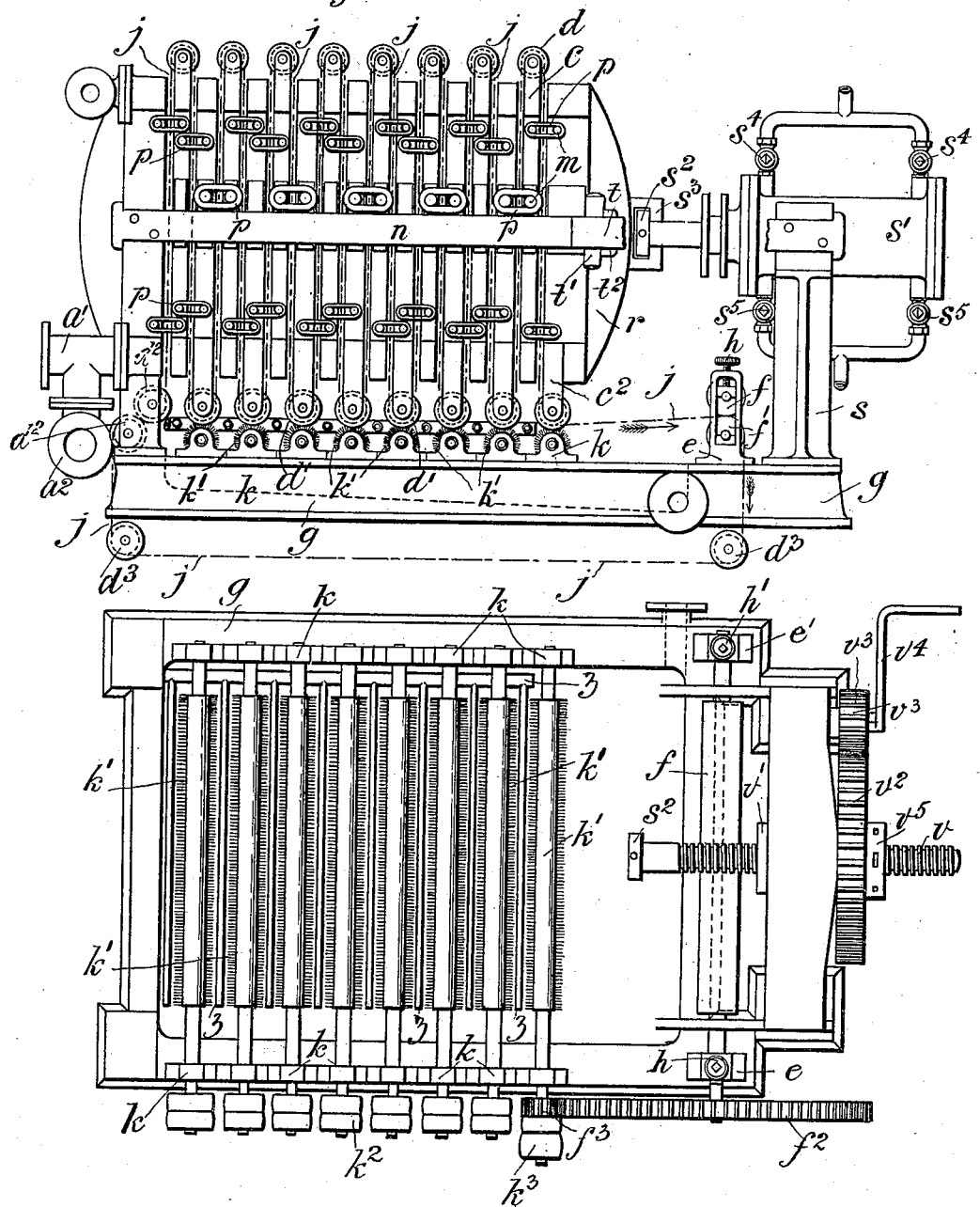

No. 629,642. Patented July 25, 1899.
J. WILSON.
FILTER PRESS.
(Application filed Feb. 9, 1899.)
(No Model.) 3 Sheets—Sheet 3.
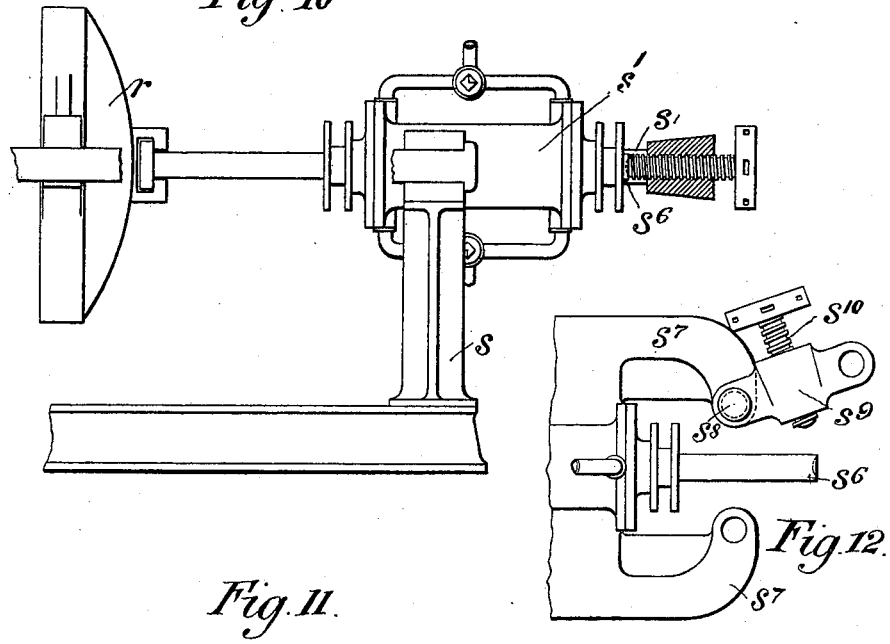
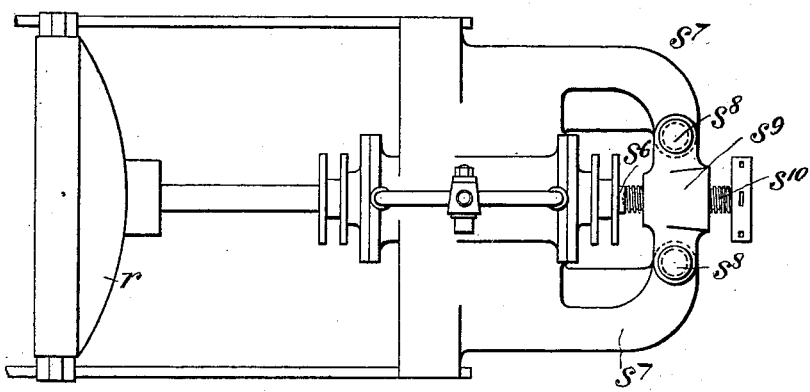
Witnesses:
Clarence A. Bateman
Percy C. Bowen
Inventor:
John Wilson
by Wilkinson & Fisher
Attorneys.

UNITED STATES PATENT OFFICE.

JOHN WILSON, OF GLASGOW, SCOTLAND.

FILTER-PRESS.

SPECIFICATION forming part of Letters Patent No. 629,642, dated July 25, 1899.

Application filed February 9, 1899. Serial No. 705,111. (No model.)

*To all whom it may concern:*

Be it known that I, JOHN WILSON, of 1 Hill street, in the city of Glasgow, Scotland, have invented certain new and useful Improvements in and Relating to Filter-Presses and Similar Filtering Apparatus; and I do hereby declare the following to be a full, clear, and exact description of the invention, such as will enable others skilled in the art to which it appertains to make and use the same.

This invention, which relates to filter-presses and similar filtering apparatus, has for its object the provision of means for periodically removing the deposit formed upon the surface of the filtering medium and is particularly applicable to filter-presses where the deposit is of such a nature as to prevent filtration before it has acquired sufficient depth to be removed in the form of cakes by the ordinary methods.

Figure 1 is a longitudinal elevation of my improved filter-press, showing the course of the filter-cloth, the plates being opened out for that purpose, and mechanism for closing up and tightening up the plates and frames, as hereinafter more fully referred to. Fig. 2 is a plan of the bed-plate upon which the filter-press stands, showing the brushes for brushing the cloth, also a mechanical form of opening out, closing up, and tightening up the plates and frames, being an alternative method to that shown in Fig. 1. Fig. 3 is an elevation of one of the plates, showing the under roller attached thereto, combined with a section of the bed-plate and one of the revolving brushes. Fig. 4 is a cross-section of the plate, showing the method of grooving the surface thereof. Fig. 5 is an end elevation of part of two plates and one frame, showing the form of the lower corners of the plates when a scraper is used in addition to or without a revolving brush. Fig. 6 is an elevation of one of the frames, showing the upper roller attached thereto. Fig. 7 is a cross-section of a frame, showing the vertical bars or grooves. Figs. 8 and 9 are respectively part views, drawn to an enlarged scale, illustrating the method of mechanically drawing out the plates and frames, showing the position of the links when the plates are open (vide Fig. 8) and closed, (vide Fig. 9.) Figs. 10 and 11 are elevation and plan, respectively, of a third alternative method to be employed for opening out, closing up, and tightening up the plates and frames. Fig. 12 is a part elevation corresponding to Figs. 10 and 11, illustrating how the end plate of filter-press is withdrawn.

The plates and frames are constructed as shown in Figs. 3 and 6, the main inlet-channel being formed as at $a$ and the channel for water, steam, or air as at $b$. To the entrance or end of the channel $a$ are attached two T-pipes $a'$ $a^2$, Fig. 1. To the outer flange of $a'$ is connected the inlet valve or cock (not shown on the drawings) for the unfiltered liquid, and to the two branches of $a^2$ are connected, respectively, suitable valves or cocks, (not shown on the drawings also,) one of which is used for running off the contents of the filter prior to opening out and the other for running off the waste water used in washing the cloth, &c.

To the upper edges of the frames and to the lower edges of the plates I attach small brackets $c$ $c'$ $c^2$ $c^3$, respectively, which in turn hold in position the upper roller $d$ and lower roller $d'$. These brackets may be cast along with the plate or frame, respectively, the means of holding the rollers being adapted suitably thereto.

To the bed-plate $g$ I attach two brackets $e$ $e'$, which accommodate the two rollers $ff'$, Figs. 1 and 2. These rollers are kept in close contact by means of the small screws $h$ $h'$. Additional rollers $d^2$ and $d^3$, Fig. 1, are provided, the former being attached to the legs of the fixed head of the filter and the latter to the bed-plate $g$.

The filter-cloth $j$ is passed over the rollers $d$ $d'$ $d^2$ $d^3$ and through the rollers $f$ $f'$, as shown in Fig. 1, and upon the wheel $f^2$ being rotated by the pinion $f^3$ in the direction shown by the arrows in Fig. 1 the cloth $j$ is drawn through the press.

To the bed-plate $g$ are fixed a number of small bearings $k$, which accommodate revolving brushes $k'$. These brushes are actuated in one direction and contrary to the direction in which the cloth $j$ travels by means of the small pulleys $k^2$, and the position of the brushes is such that they come into sufficient contact with the cloth $j$ when passing over the bottom rollers $d'$ and when the plates and frames are opened out the necessary distances, as shown. Power for driving the brushes and turning the rollers $f f'$ is communicated by means of the pulley $k^3$, or in place of this pulley a handle may be utilized where the employment of manual labor would be necessary or more suitable.

In order to open out the plates and frames equidistantly and expeditiously, I have them cast, as shown in Figs. 1, 3, and 6, with round projections $m$ upon their edges. These projections are connected together by means of the small hoops, links, or rings $p$, which are of such size or dimension that upon the back plate $r$ being drawn back each plate and frame is drawn out in succession such distance as the size of the hoops will permit, as illustrated in Figs. 8 and 9. They are also so arranged one below the other that upon the closing together of the plates they do not come in contact and prevent the plates so meeting, as will be better understood reference being had to Fig. 1.

As the drawing out of the plates and frames is an operation requiring a certain amount of power and it is desirable to minimize the manual attendance necessary, I adopt either of three methods of performing this, one of which is shown in Fig. 1, one in plan in Fig. 2, and the other in Figs. 10 and 11.

In Fig. 1 I form a cylinder $s'$ in the back frame or gauntree $s$. Within this cylinder work a piston and piston-rod, and to the end of the piston-rod is attached a ring $s^2$. This ring works within a suitable projection $s^3$ on the back plate $r$. Water or air under pressure is admitted to the cylinder by either of the cocks $s^4$, the waste water or air escaping by the cocks $s^5$. The side bars $n$ are provided with straps at $t$, in which a key and cotter $t'$ $t^2$ are inserted and which serve to keep tight the plates and frames during the process of filtration after the piston within the cylinder has pushed the plates, &c., as close as the power employed will allow.

In Fig. 2 a screw $v$ is provided, which works within the boss $v'$. To this boss is attached the spur-wheel $v^2$, which in turn is actuated by the pinion $v^3$ and handle $v^4$. By the aid of the smaller wheel $v^5$, which is rigidly attached to the wheel $v^2$, and the use of a crowbar the plates, &c., can be given the extra pressure necessary to keep them tight.

In Figs. 10 and 11 the process of drawing the end plate $r$ backward and forward is the same as shown in Fig. 1; but in the final tightening up a different device is adopted. The piston-rod projects through the back cover at $s^6$, and along with the cylinder $s'$ and gauntree $s$ are cast two strong arms $s^7$. Into these arms by means of the pins $s^8$ is connected the cross-bar $s^9$, which accommodates the screw $s^{10}$. The end of this screw presses upon the end of the piston-rod at $s^6$ and serves to finally tighten up the plates and frames, as seen in Fig. 11. In slackening back the screw $s^{10}$ as soon as the screw clears the end of piston-rod one of the pins $s^8$ may be removed and the cross-bar $s^9$ swung around so as to clear the piston-rod. As in some instances it is desirable to scrape off the deposit on the cloth before the brushes come into play, I provide for that in the manner shown in Fig. 5. The projections $c^3$, which I attach to the bottom of the plates, are formed in the manner and shape shown, with a slit $c^4$. Into this slit is inserted a scraper $c^5$, which may be formed of any suitable material and may or may not be faced with india-rubber. These scrapers may be kept in suitable contact with the cloth in a variety of well-known methods, one only of which is shown.

To facilitate the removal of the deposit from the cloth by the brushes, I provide a series of pipes $z$, perforated with small holes and running between each plate, as shown in Figs. 1 and 2. Water or steam may be forced into these pipes and, according to the position of the perforated holes, projected onto the most suitable points of the cloths while the brushes are revolving.

As for the purpose of better cleaning the cloths (it is advisable to use low pressures) I form the plates as shown in section in Fig. 4. The projections which form the grooves are horizontal and formed of suitable depth and distance from each other. By this means a larger proportion of the area of the cloth is free from the metal of the plate, and the winding of the cloth may be stopped at such points as will insure the cloth resting on different successive points after each cleaning.

In the frames, as shown in Figs. 6 and 7, I form a series of vertical bars or divisions $x$. When water, steam, or air is applied at the back of the cloths, these bars tend to assist the loosening of the deposit prior to its final removal by the brushes, besides serving to counteract the effect of the bulges which are necessarily formed in the cloth by the horizontal ribs on the plates.

I claim—

1. In a filter-press the combination of rollers secured to the top of the frames and the rollers secured to the bottom of the plates in order to carry the filtering-cloth substantially as and for the purpose set forth.

2. In a filter-press the combination of a hydraulic cylinder in the back frame with a swinging screw for the closing up and withdrawal of the sectional plates substantially as and for the purpose set forth.

3. In a filter-press, the combination with the filter-plates carrying rollers for the passage of the filtering-cloth, of means for causing the said filtering-cloth to pass over the said rollers, and means for cleaning the said cloth, substantially as described.

4. In a filter-press, the combination with the filtering-frames carrying at one end rollers for the passage of the filtering-cloth, and plates provided at opposite ends with rollers for the passage of the filtering-cloth; of means for moving the filtering-cloth, and means for cleaning the same, substantially as described.

5. In a filter-press, the combination with a cylinder, and a piston working in said cylinder, said piston having an extension through the rear of said cylinder; of a swinging block in rear of said cylinder, and a screw carried in said swinging block to engage the end of said rearward extension of the piston-rod, for securing the piston at the end of its forward stroke, substantially as described.

JOHN WILSON.

Witnesses:
EDITH WILSON,
JOSEPH HENRY PEARSON.